United States Patent [19]
Haeberle et al.
[11] 3,825,899
[45] July 23, 1974

[54] EXPANSION/COMPRESSION AND ELASTIC BUFFER COMBINATION

[75] Inventors: Heinz H. Haeberle, Bethesda, Md.; John M. Husted, Vienna, Va.

[73] Assignee: Communications Satellite Corporation, Washington, D.C.

[22] Filed: Aug. 11, 1971

[21] Appl. No.: 170,933

[52] U.S. Cl. ........ 340/172.5, 179/15 BA, 179/15 BS
[51] Int. Cl. .............................................. H04j 3/00
[58] Field of Search .................... 179/15 BA, 15 BS; 340/172.5

[56] References Cited

UNITED STATES PATENTS

| | | | |
|---|---|---|---|
| 3,136,861 | 6/1964 | Mayo | 179/15 A |
| 3,420,956 | 1/1969 | Heightley et al. | 179/15 BS |
| 3,461,245 | 8/1969 | Johannes et al. | 179/15 BS |
| 3,480,734 | 11/1969 | Kuroyanagi et al. | 179/15 BS |
| 3,541,524 | 11/1970 | Blasbalg et al. | 179/15 BA |
| 3,569,631 | 3/1971 | Johannes et al. | 179/15 BA |
| 3,652,800 | 3/1972 | Dooley | 179/15 BA |

*Primary Examiner*—Gareth D. Shaw
*Attorney, Agent, or Firm*—Sughrue, Rothwell, Mion, Zinn & Macpeak

[57] ABSTRACT

In a satellite transponder communications system operating in a time division multiple access mode, each earth station transmits data in a burst format. All bursts within a single transponder frame are synchronized to a special reference burst which contains no data communications. A single earth station sends out the reference burst as well as its normal burst, and in the case of a multitransponder and multi transponder frames, the single reference station sends out all of the reference bursts for the various transponder frames. Data to be transmitted may be received in many different forms and included within the same burst because of the modular arrangement of the earth stations. Individual terrestrial interface modules receive data in various forms, convert the data into bit form which is compatible with the TDMA system, store the converted bit stream and hold the compressed block of data until a multiplexer requests the block of data for inclusion into the earth stations transmitted burst. The arrangement of blocks of data within a burst and the timing and duration of a burst is controlled by digital words stored in a memory. Complete reordering of burst times and the arrangement of blocks of data within a burst is accomplished by changing the words stored in the memory. A comparable system on the receive side of the earth station extracts blocks of data in selected bursts for conveyance to selected terrestrial interface modules. A terrestrial interface module is provided for receiving data at a rate asynchronous with the TDMA bits rate and adding or subtracting dummy bit where necessary to provide the data out of the terrestrial interface module at a rate synchronized to the TDMA bit rate. The elastic buffer and compression/expansion buffer functions, necessary for handling asynchronous data and confining the data to assigned burst times, respectively, are combined in a single elastic-compression buffer on the transmit side and a single elastic-expansion buffer at the receive side.

9 Claims, 10 Drawing Figures

*INVENTORS*
HEINZ H. HAEBERLE,
JOHN M. HUSTED

BY Sughrue, Rothwell, Mion, Zinn & Macpeak
*ATTORNEYS*

EXPANSION/COMPRESSION AND ELASTIC BUFFER COMBINATION

BACKGROUND OF THE INVENTION

This invention is in the field of time division multiple access (TDMA) communications systems and, more particularly, to the use of compression-expansion buffers in a synchronous, TDMA communications systems.

In TDMA satellite communications systems, a number of earth stations share a satellite in a time division fashion. Each earth station transmits, in one frame interval, a burst of information during a predetermined time such that the burst arrives at the satellite without overlapping the bursts from the other earth stations. This type of system is known as a burst operated system (as distinguished from a continuous transmission system) since the information from each earth station is transmitted in bursts.

The burst of a particular earth station includes a preamble portion and an information portion. The preamble portion comprises all the signalling necessary to provide proper timing and routing of the information. The information portion comprises a number of time slots or sub-bursts which contain information intended for various earth stations.

Each earth station receives the information to be transmitted from terrestrial, digital input sources. In a synchronous TDMA system the terrestrial input data rates are synchronized to the TDMA data rate. That is, the number of input information bits transmitted continuously to the earth station during each TDMA burst period is constant, and is determined by the number of information bits in the corresponding TDMA bursts. In a synchronous TDMA system, a compression buffer at the transmitter transforms the continuous terrestrial bit stream which is to be transmitted into the TDMA burst format and an expansion buffer in the receiver transforms the TDMA burst format back into the received continuous bit stream.

In other TDMA systems there will be arriving at the earth station digital data at rates which will not be synchronized to the TDMA data rate. This type of system is an asynchronous TDMA system. The difference in data rates is caused by the fact that the bit clock for the terrestrial, digital system is not synchronized with the TDMA clock. For an asynchronous system the number of terrestrial bits per TDMA frame may vary $\pm 30$ parts in $10^6$ bits, for example. In this case, to maintain synchronism the earth station would need to transmit 1 more or 1 less bit per TDMA frame once every 20 frames (assuming a 6.335 Mb/S terrestrial data rate and a 250 $\mu$ sec. TDMA frame). The process of transmitting 1 more or 1 less bit is known as pulse stuffing.

A prior art technique for transforming the asynchronous data rate in the terrestrial links into the synchronous TDMA data rate and forming the data into bursts comprises, at the transmitter, in series, a stuffing buffer and a separate compression buffer, and at the receiver, in series, an expansion buffer and destuffing buffer. The terrestrial, digital data stream is fed into the stuffing buffer wherein the data rate is converted, by means of pulse stuffing, from the data rate of the terrestrial link to the data rate of the TDMA system. The stuffing buffer receives the digital data in continuous form and outputs the digital data in continuous form. The continuous, digital data stream is then fed to a compression buffer for storage. Then, at the proper time, this stored data is read out of the compression buffer in order to position the data in a burst time slot for transmission to a receiver. At the receiver, the digital data is converted from burst format to continuous form and the "stuffed" pulses removed.

This prior art technique for pulse stuffing and burst forming has the disadvantage of requiring the use of a continuous clock phase locked to the TDMA burst clock in order to read out the contents of the stuffing buffer at the TDMA synchronous data rate. In addition, there is also the requirement of a separate stuffing buffer and compression buffer. These same disadvantages occur at the receiver wherein a continuous clock phase locked to the TDMA burst clock must be derived for purposes of reading into the destuffing buffer, in continuous form, the data from the expansion buffer.

The present invention has the advantage of using the compression and expansion buffers not only for burst formating but also for pulse stuffing. There is therefore, a savings in buffer hardware. In addition, the stuffing scheme of the present invention has the advantage of requiring no continuous clock phase locked to the TDMA clock as is required with stuffing schemes using stuffing buffers separate from compression buffers.

SUMMARY OF THE INVENTION

In accordance with the present invention, continuous, terrestrial, digital data is written into a compression buffer. The number of bits written into the compression buffer in a frame period is counted to determine if any stuffing is required. At the proper time the compression buffer is enabled to output its contents in burst form at the synchronous TDMA clock rate. If pulse stuffing is required, the compression buffer outputs the appropriate number of stuff bits necessary for the synchronization of the TDMA system. In addition, a pulse stuffing code word is transmitted with the burst to inform the receiver of the stuffing decision.

At the receiver, the destuffing apparatus receives the transmitted burst including the preamble, the information bits and the pulse stuffing code. In response to the pulse stuffing information provided by the pulse stuffing code an expansion buffer is enabled to process the "stuffed" bits and convert the received, burst format into continuous, digital form at the terrestrial clock rate.

The invention includes a technique for stuffing each frame period or only once every several frame periods.

DETAILED DESCRIPTION OF DRAWINGS

The invention pertains particularly to a terrestrial interface module. The terrestrial interface module forms a part of an overall time division multiple access satellite communications system described in detail in the following U.S. applications:

1. Inventor: William Schmidt et al., Ser. No. 170,796, entitled "A TDMA Satellite Communication System Having Special Reference Bursts," filed Aug. 11, 1971,
2. Inventor: William Schmidt et al., Ser. No. 170,929, entitled, "A TDMA Satellite Communication Systems With Improved Acquisition," filed Aug. 11, 1971,
3. Inventor: William Schmidt et al., Ser. No. 170,932, entitled, "A TDMA Satellite Communication System With An Aperture Window For Acquisition," filed Aug. 11, 1971,
4. Inventor: William Schmidt et al., Ser. No. 170,930, entitled, "A TDMA Satellite Communication System With Rapid Automatic Re-Entry," filed Aug. 11, 1971,
5. Inventor: William Schmidt et al., Ser. No. 170,931, entitled, "A TDMA Communications Satellite System With Multi-PCM Frames Per TDMA Frame," filed Aug. 11, 1971,
6. Inventor: William Schmidt et al., Ser. No. 170,797, entitled, "A TDMA Satellite Communications System," filed Aug. 11, 1971. The terrestrial interface module which constitutes the present invention is described in detail in connection with FIGS. 5 through 10 of the present application. However, before describing the latter figures a general explanation of the overall TDMA system with which the subject invention operates will be described in connection with FIGS. 1 through 4. For the additional details of the overall TDMA system, reference should be made to any or all of the above-identified applications.

Figure 1:
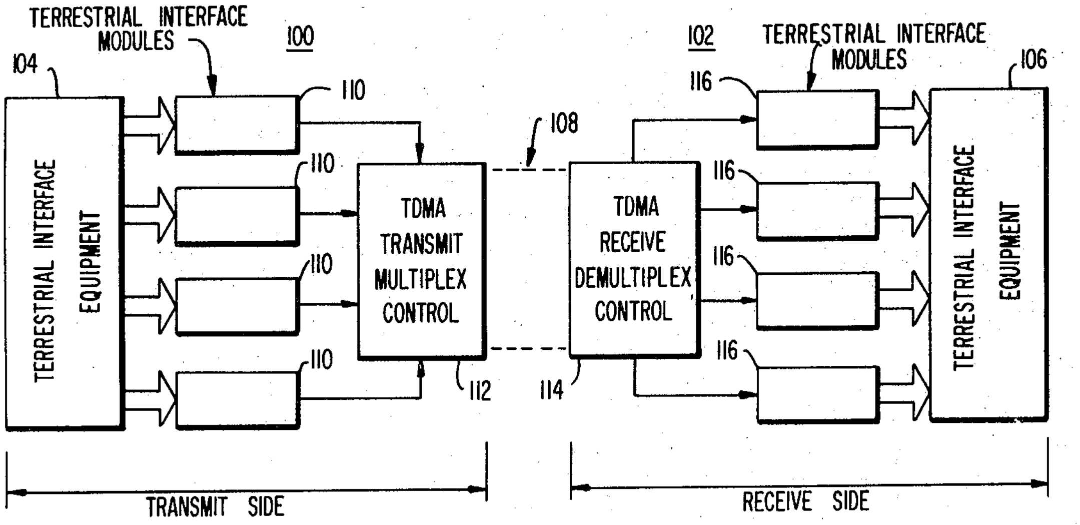
FIG. 1 is a general block diagram of a TDMA system.

A simplified block diagram of a satellite TDMA (Time Division Multiple Access) system is illustrated in FIG. 1. The equipment which is on the transmit side is shown generally at 100 and the equipment on the receiving side is shown generally at 102. The transmission medium 108 is intended to include a satellite transponder. As will be appreciated by anyone familar with the satellite communications art, an earth station including transmit equipment would also include receive equipment. However, for ease of understanding the transmission equipment only is shown at one terminal and the receiver equipment only is shown at another terminal.

The terrestrial interface equipment 104 and 106 are not typically part of any earth station but represent the systems which convey signals for transmission to and which receive signals transmitted from distant earth stations. The means for deriving signals to be transmitted via a satellite transponder forms no part of the subject TDMA system. The signals may be voice signals, data signals, video signals, etc. The only requirement is that the signals to be transmitted must be capable of being converted into bit streams at the input rate of the TDMA system.

The TDMA system disclosed herein is a modular system. That is, it is comprised of building blocks which enable the system to be built at relatively low cost and added onto in future years. The transmit side includes a number of modules 110 which are known as terrestrial interface modules (TIMs). The TIMs are basically signal conversion devices and the particular form of TIM depends upon the form of signal received from the terrestrial interface equipment. For example, if single channel voice information is the input to a particular TIM, the TIM must be a system which is capable of sampling the voice data, converting the samples into codes and presenting digital data in a form ready for transmission by the TDMA transmission side. If the input to a TIM is multiple analogue channels, then the TIM must have the additional capability of multiplexing the input analogue signals as well as sampling and converting each sample into a code. There are three basic types of TIM modules dependent upon the class of input signal entering the modules. These are voice-frequency interface modules, FDM interface modules, and direct digital interface modules. Individual apparatus for converting input signals of the type described into digital signals which may be handled by the TDMA transmit equipment are known in the art. One feature which must be added to known systems so that they will become suitable TIM units for use in the described TDMA system is compression/expansion buffers. Compression buffers are needed at the transmit side and expansion buffers are needed at the receive side. Although the use of compression/expansion buffers is not in itself novel, it is novel to have separate TIM units, each with its own compression/expansion buffer.

As indicated above, with TIM receives signals in a form which is not controlled by the earth station system. For example, in many cases the form of the signal received will be the form which the telephone company desires to transmit to the earth station for processing. Voice channels are typical of the type of input signals. As explained above the TIM converts the input voice channel signals into a bit stream representing the input signals. However, the bit stream is continuous whereas the earth station and the TDMA system is allowed to transmit only during finite periods of time, hereinafter referred to as the burst time for the particular earth station. Furthermore, since there are many TIM units involved at a single earth station, each burst time for the earth station is sub-divided into time separated sub-bursts. Consequently, the bit stream in the TIM must be compressed and transmitted only during the sub-burst time which is allocated to the particular TIM. This compression is accomplished by the compression buffer. Basically, the entire contents of a bit stream occurring during a single TDMA frame period is stored in a memory portion of the compression buffer. When the next sub-burst time for the particular TIM occurs the stored bit stream is read out at a rate which is sufficient to transmit the entire bit stream via the TDMA transmission equipment during the sub-burst time.

Figure 2:
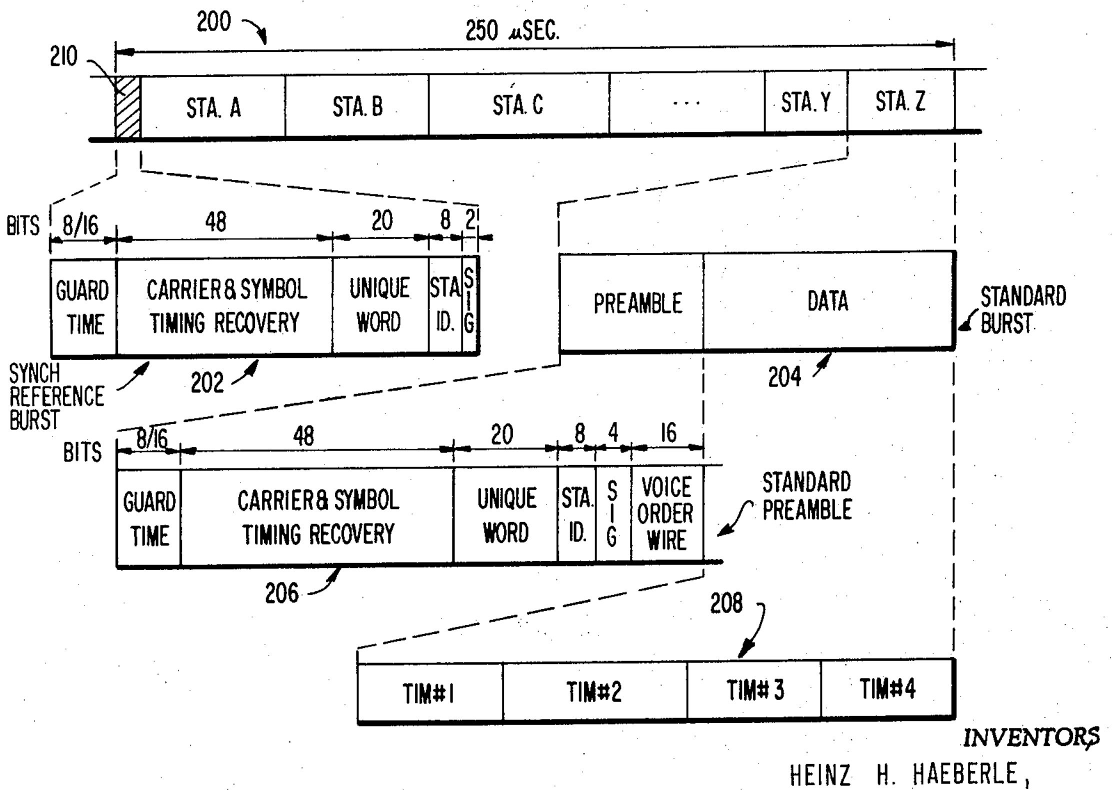
FIG. 2 illustrates the frame and burst formats for the system shown in FIG. 1.

A better understanding of the relationship between frame rate, bursts, and sub-bursts can be had by referring to FIG. 2 wherein the numeral 200 represents a frame of the TDMA system. In the specific example described herein it is assumed that a TDMA frame is 250 microseconds and there are Z stations participating in the TDMA system. As is well known, in TDMA each station transmits a burst of information at a time synchronized with all other stations such that the bursts from all stations in the system will be received at the satellite transponder in non-overlapping time sequences. Typically, each station will send one burst per frame.

The format of a typical station burst is shown by numeral 204 as comprising a preamble followed by a data portion. In the context used herein, data refers to subscriber information which is to be sent at the request of subscribers, whereas the preamble includes signaling, synchronization and housekeeping information. For the particular example described herein the bit rate of the TDMA system will be assumed to be 60 mega bits per second. Transmission is assumed to be four phase PSK and consequently the symbol rate is 30 mega bits or megasymbols per second. (As is well known in four phase PSK a symbol comprises two bits which are transmitted simultaneously).

An example of a preamble for any given earth station is illustrated at 206 in FIG. 2. The first 8 to 16 bit spaces are taken up by guard time which is simply a short period of non transmission required to insure no overlap between adjacent station bursts. This is followed by 48 bits of carrier and symbol timing recovery as is well known in the art. A 20 bit unique word follows for synchronizing the receivers. In many systems proposed in the prior art a different unique word is sent from each station. However, in the specific example described herein the 20 bit unique words sent in the preamble of all regular station bursts are identical. In order to identify the individual station which is sending the burst, an 8 bit station identification code follows the 20 bit unique word. The station identification code is followed by 20 bits which are used for internal signaling and housekeeping functions. The use of this space for signaling and housekeeping functions is well known in the art and will not be discussed in any detail herein. The preamble of the regular burst is followed by the data portion of the burst. Unlike systems proposed in the prior art, the data portion of the burst, as shown at 208, is divided into sub-bursts. Each sub-burst contains data taken from a TIM module. For the example shown at 208 in FIG. 2 it is assumed there are four TIM modules at station Z.

In referring to the unique word above, it was pointed out that the 20 bit unique word is the same for all stations in the "regular" bursts. The term regular is used herein to differentiate between a station burst which contains data and a station burst which is used solely as a frame reference. In systems proposed in the prior art, the regular burst from one of the stations, e.g. station A, additionally served the function of a frame reference. That is, all of the other stations synchronized their burst times to the station A unique word. Although this has the advantage of conservation of transmission time, it presents difficulties when there is a power failure at station A or for any other reason station A goes off the air. In the prior systems, when the reference station ceases transmitting, a secondary reference station must take over and the latter station's regular burst must become the reference burst. However, when the secondary station, e.g. station B, uses its regular burst as the reference burst all other stations within the TDMA network must move their burst times relative to the new reference since the position of the frame reference relative to these stations has now changed. There are now a number of problems encountered in the movement of the bursts.

In the specific example described herein these problems are overcome by transmitting a special burst which serves as a reference burst and which does not include a data portion. The reference burst is shown diagramatically at 210 in FIG. 2. The reference burst may be sent by station A with stations B and C being secondary reference stations having the capability of sending out the reference burst if the power of station A fails. However, unlike the prior art systems, if for some reason station A fails even though a new station must take over the reference function, the reference burst is sent at the same relative time within the frame so that none of the regular bursts from the participating stations need be adjusted. The format for the reference bursts is shown at 202 and comprises 48 bits of carrier and symbol timing recovery, a 20 bit reference unique word which is different from the regular unique word, an eight bit station identification code, and 2 bits of signaling.

Referring back to FIG. 1, the TDMA transmit and multiplex control unit 112 controls the formatting of the burst for the station. The advantage of the modular concept is that as far as the unit 112 is concerned the form of the signals at the TIM inputs are irrelevant. The unit 112 merely looks at each TIM as a separate storage means which stores a separate block of data. At the sub-burst time assigned by the unit 112 to a TIM module 110, the next 112 extracts the block of data from the TIM and transmits it through the TDMA system during the assigned sub-burst time. On the receive side the unit 114 and TIM modules 116 operate in a manner opposite to that of unit 112 and TIM modules 110. In unit 114, the sub-bursts are extracted and sent to the respective TIM units 116 in accordance with prearrangement. As in the case of the transmit portions of the TIM units 110 the receive portions of the TIM units 116 may be of various different types for the purpose of converting the received sub-groups into continuous signals of various form, e.g., voice, TV, digital data. An expansion buffer in each TIM 116 performs the reverse function of the compression buffer in the TIM units 110.

The TDMA equipment at each earth station includes three basic sub-systems which are referred to as the transmit side sub-system, the receive side sub-system, and the control sub-system. Very generally, the transmit side sub-system extracts the data blocks from the TIM units at the proper sub-burst times, adds the preamble information, and transmits the entire station burst at the appropriate time. The receive side subsystem receives all station bursts via the transponder, extracts the data destined for the local earth station, separates the sub-bursts in the received data, and sends the sub-bursts to the appropriate TIM units. The common control sub-system operates to maintain the station burst at the proper position and in synchronism with the TDMA frame reference, provides for burst acquisition when synchronization is lost or when the station is first entering the frame, and provides other housekeeping and signaling functions.

Figure 3:
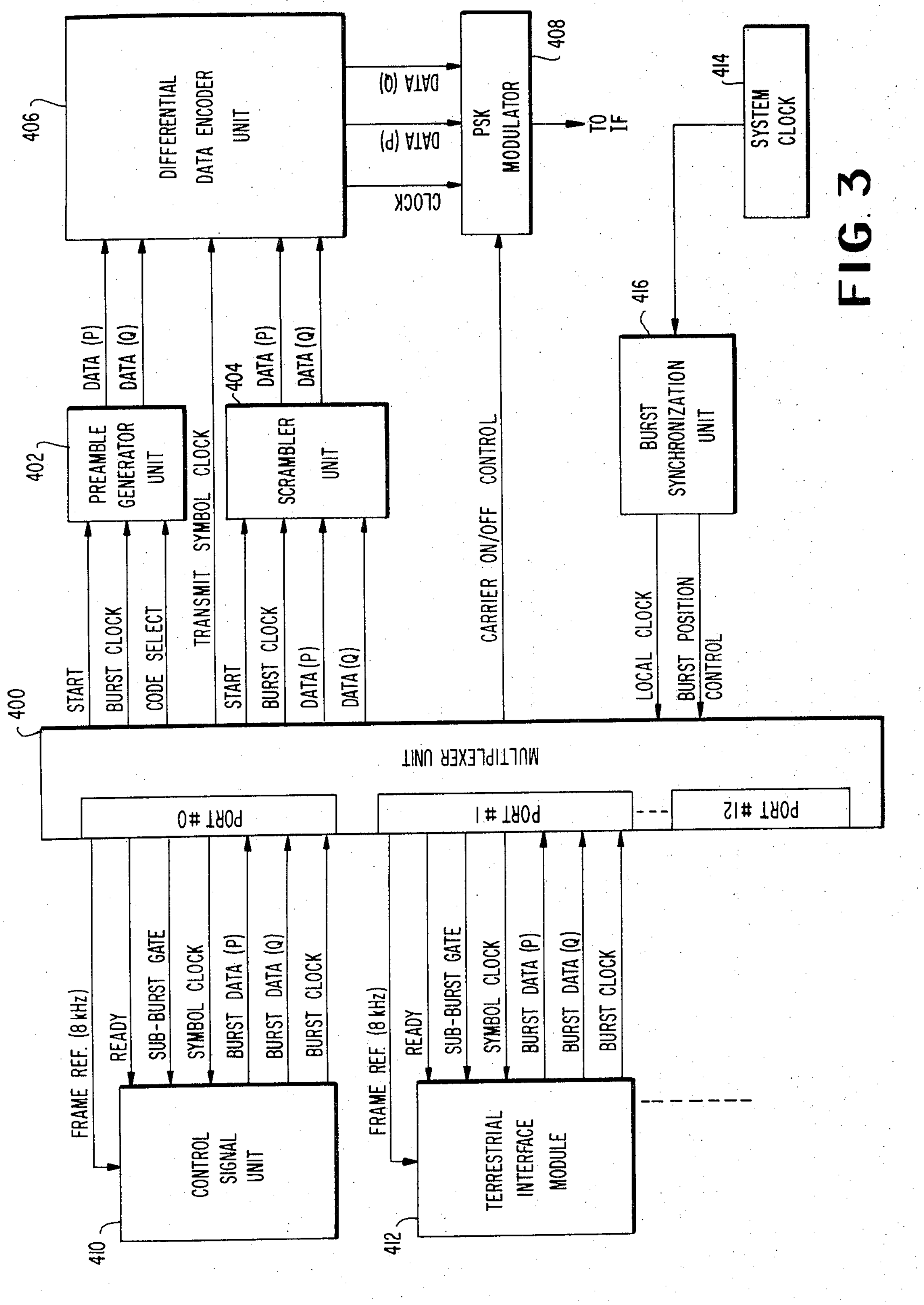
FIG. 3 is a block diagram of the transmit side subsystem of an earth station.

A general block diagram of the transmit side sub-system with connection to other elements is illustrated in FIG. 3 and comprises a multiplexer unit 400, a preamble generator unit 402, a scrambler unit 404, a differential data encoder unit 406, and a PSK modulator 408. The output from the PSK modulator 408 is a stream of four phase PSK modulated IF, which is sent to an up convertor which converts the four phase PSK IF into the proper up-link transponder frequency for transmission to the satellite. The PSK modulator is turned on at the beginning of the burst and turned off at the end of the burst under control of a burst synchronization unit 416 which is part of the common control sub-system and which will be explained in more detail hereafter. The burst synchronization unit 416 is under the control of a system clock 414. The multiplexer unit 400 is illustrated as having thirteen ports, 0–12, for accommodating 12 TIM units 412 and one control signal unit 410. The control signal unit is a system known in the prior art and is part of the common control sub-system. As far as the multiplexer unit is concerned the control signal unit 410 looks just like another TIM unit since it merely presents a block of bits ready for selection at the command of the multiplexer unit. However, unlike the TIM units, the block of bits presented by the control signal unit comprises the signaling information referred to above.

Since the system described in the example is a four phase PSK system, all transmission of bits is via two channels, hereinafter designated, respectively, as the P and Q channels. The burst synchronization unit 416 sends a start signal to the multiplexer unit 400 along with a local clock at the symbol rate of 30 mega bits per second. At the start of the burst transmission time, the multiplexer unit initiates the preamble generator unit 402. Basically, the preamble generator unit 402 generates the carrier and symbol recovery timing as well as the regular or reference unique word. A preamble generator unit is somewhat a misnomer becuase it generates only a portion of what is commonly referred to as the preamble. Referring back to FIG. 2, numeral 206 indicates that the preamble includes the carrier and symbol timing recovery, the 20 bit unique word, plus an additional 28 bits (14 symbols) of station identification signaling and housekeeping functions. However, the latter 28 bits are not generated by the preamble generator unit 402 but instead come from the control signal unit. For the present purpose it is sufficient to understand that the station identification code and the other signaling and housekeeping data is stored as a block in the control signal unit ready for extraction by the multiplexer unit. When the last symbol of the unique word has geen generated by the preamble generator unit 402, multiplexer unit 400 sends a sub-burst gate and a symbol clock to the control signal unit 410. During the duration of the sub-burst gate, the block of bits in the control signal unit passes through to the scrambler unit 404. As previously described, this data appears on the P and Q channels. The symbol clock also appears at the output of the control signal unit as the burst clock and is also applied to the scrambler unit. The TIM units 412 are controlled in exactly the same way. That is, at the proper respective times a sub-burst gate and the symbol clock are applied to the respective TIM unit causing a read out of the respective P and Q channels of data along with the burst clock. This data and clock is applied through to the scrambler unit. As illustrated in the figure, each TIM 412 and the control signal 410 also receive a frame reference signal and a ready signal. The frame reference signal is the same for all TIMS and the control signal unit 410 and merely synchronizes the units 412 and 410 to the TDMA frame. This is necessary since the data extracted from any given TIM unit during a single sub-burst corresponds to the data received and converted by the TIM unit during the entire previous frame. The frame reference signals consequently are used to segregate the data bits in the TIM into individual blocks for transmission during a single sub-burst. The ready signals are merely warning signals to the units 412 and 410 which occur 8 symbols in advance of the start of the sub-burst gate for the respective unit 410 or 412. The sub-burst gates occur sequentially and consequently the blocks of data from the respective TIM units will appear at the input of the scrambler unit 404 is preassigned non-overlapping sequence. The scrambler unit 404 is a known device and its purpose is to impart a more nearly random nature to the transmitted bit stream thus providing a more evenly distributed power spectrum at the PSK modulator (408) output. Essentially, the scrambler unit comprises a pseudo-random code generator for generating a long pseudo-random bit code and an exclusive OR circuit for adding the pseudo-random code modulo-2 to the input data. The reverse of the scrambler unit, a descrambler unit appears at the receive side.

The data from the preamble generator unit 402 and the scrambler unit 404 are applied to the differential data encoder unit 406. This also is a known device. The purpose of the differential data encoder unit is to add coding to the data channels to distinguish the P channel from the Q channel. In the absence of a unit serving this purpose, a receiver could mix up the P and Q channels.

Figure 4:
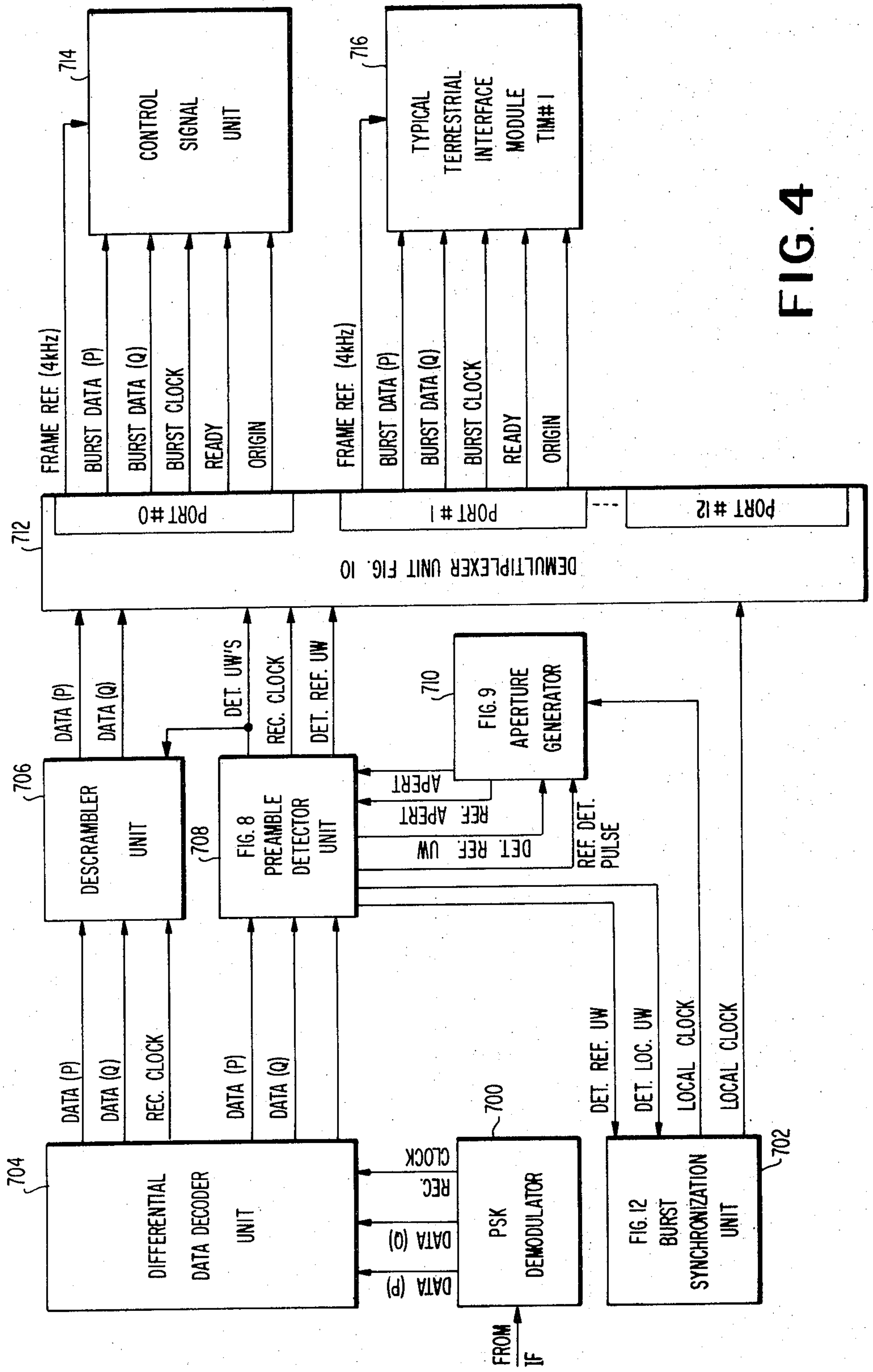
FIG. 4 is a block diagram of the receive side subsystem of the earth station.

A general block diagram of the receive side sub-system of the TDMA terminal is illustrated in FIG. 4. The signals received via the transponder on the satellite are applied, after being frequency down converted into an IF frequency, to the PSK demodulator 700. As is well known in the art, the PSK demodulator 700 recovers a clock signal from the incoming PSK modulated signals and also derives the P and Q data streams therefrom. The recovered clock as well as the P and Q data streams are applied to a differential decoder unit 704, which as is well known in the art, performs a function which is the complement of the function performed by the differential encoder unit at the transmit side of the sub-system. For every burst received, all symbols subsequent to the 20 bit unique word are descrambled by the descrambler unit 706 whose output is applied as an input to the demultiplexer unit 712. The descrambler unit 706 performs a function opposite to that of the scrambler unit in the transmit side sub-system. The data out of the differential data decoder unit 704 is also applied to the preamble detector unit 708 which is described in more detail in connection with FIG. 8. In general, the preamble detector unit operates to detect the four possible 20 bit unique words and to provide indications of the detection thereof to the descrambler unit 706, the demultiplexer unit 712, and the burst synchronization unit 702. It should be noted that the burst synchronization unit 702 is not considered as part of the receive side sub-system, but rather is part of the common control equipment.

The indication that a unique word has been detected by the preamble detector unit is also sent to an aperture generator 710. For the present, it is sufficient to understand that the aperture generator provides a window or aperture to the preamble detector unit during which time the preamble detector unit 708 looks for the received unique words.

The demultiplexer unit 712, like the multiplexer unit in the transmit side sub-system, has thirteen ports, 0–12, which communicate with one control signal unit 714 and twelve TIM units 716. The data input to the demultiplexer unit consists of the data in the bursts selected by the earth stations. The demultiplexer operates to extract designated bursts and sub-bursts, or portions thereof, and to apply the extracted portions to the proper TIM unit or control signal unit. In addition to applying the proper data to a particular TIM unit, the demultiplexer also provides a burst clock to the TIM for the duration of the data portion, a ready signal which precedes the data portion, and a frame reference signal.

Figure 10:
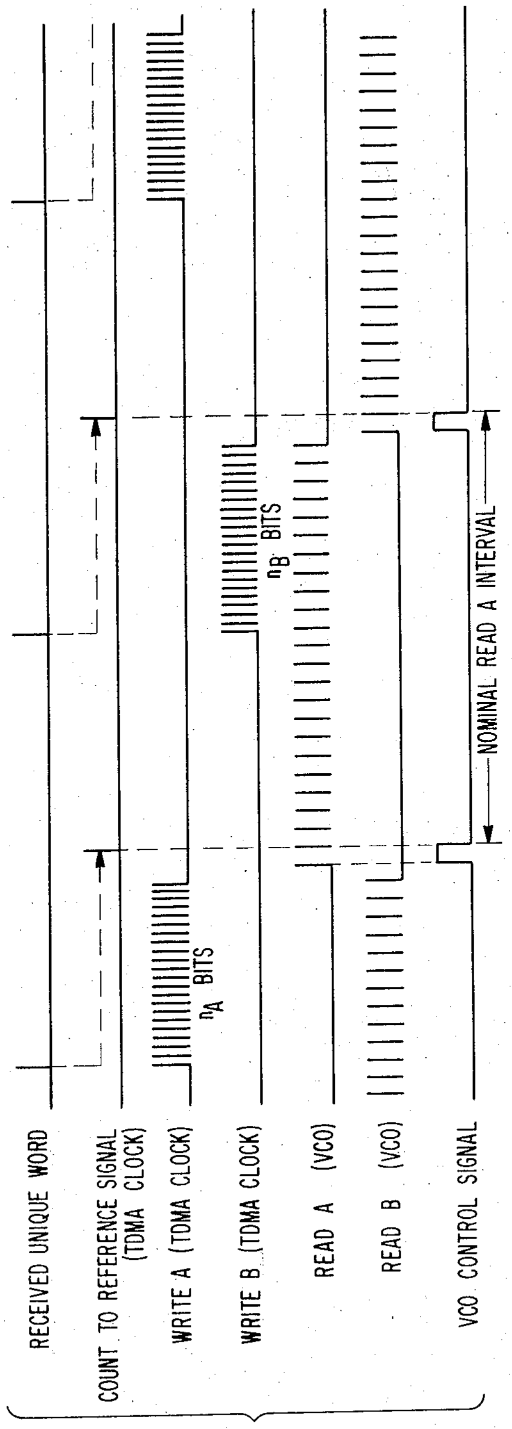
FIG. 10 is a timing diagram for the apparatus of FIG. 9.

The novel terrestrial interface module of the present invention will now be described with reference to FIGS. 5 through 10. Referring to FIG. 10 there is shown a general block diagram of the pulse stuffing and burst forming apparatus used at the transmitter. The details of this system are described below in connection with FIG. 18. Digital data from terrestrial input (TI) sources is fed into compression buffer 1600 via line 1602. The digital data is clocked into compression buffer 1600 at the terrestrial clock rate. As the digital data is clocked into compression buffer 1600, a phase detector 1604, which comprises a counter and decoder, counts the number of clock pulses received within a frame interval. Counter, decoder and phase detector 1604 receives from the TDMA multiplexer described above, a start of frame pulse and an end of frame pulse. Since there is one clock pulse per bit the number of clock pulses counted by counter, decoder and phase comparator 1604 equals the number of bits per frame fed into compression buffer 1600. If it is assumed, for purposes of explanation, that there is a 1 bit per frame asynchronous condition between the terrestrial system and the TDMA system, with the latter at the higher rate, then the counter of 1604 will have been instructed to count to x, wherein x + 1 = the number of TMDA bits/frame. Consequently, compression buffer 1600 will normally have stored therein x bits for the frame interval.

At the end of frame interval the decoder of 1604 phase detector decodes a count of *x*, assuming *x* bits have been counted and forwards a pulse to code generator 1606. Code generator 1606 has an *n*-bit code stored therein which provides the receiver with information that *x* bits are information bits. The size of the *n*-bit code (the pulse stuffing code) in generator 1606 depends on the probability of bit error in the TDMA transmission system and the requirement of the system for detecting the transmitted pulse stuffing code at the receiver, as would be well known.

When the TDMA multiplexer is ready to accept the contents of compression buffer 1600 for multiplexing with other data to form a burst of information for eventual transmission over the TDMA digital transmission system, the TDMA multiplexer sends a burst gate and burst clocks, as explained previously, to pulse to compression buffer 1600 and code generator 1606. In response to the burst clocks the code generator 1606 outputs the pulse stuffing code and then the compression buffer 1600 outputs its data. The pulse stuffing code and digital data are then multiplexed in information and signaling multiplexer 1608. The digital data from compression buffer 1600 and the pulse stuffing code from code generator 1606 are clocked out by the TDMA multiplexer clock which is the aforementioned burst clock pulses. The serial bit stream of a pulse stuffing code followed by the digital data is then forwarded to the TDMA multiplexer for transmission over the TDMA digital transmission system to the receiver shown generally in FIG. 6. As will be hereinafter discussed, the digital data fed to multiplexer 1608, which is now in burst format, will comprise 1 extra bit at the end of the data stream (or at the beginning of the data stream whichever is predetermined) as the "stuffed" bit.

Figure 6:
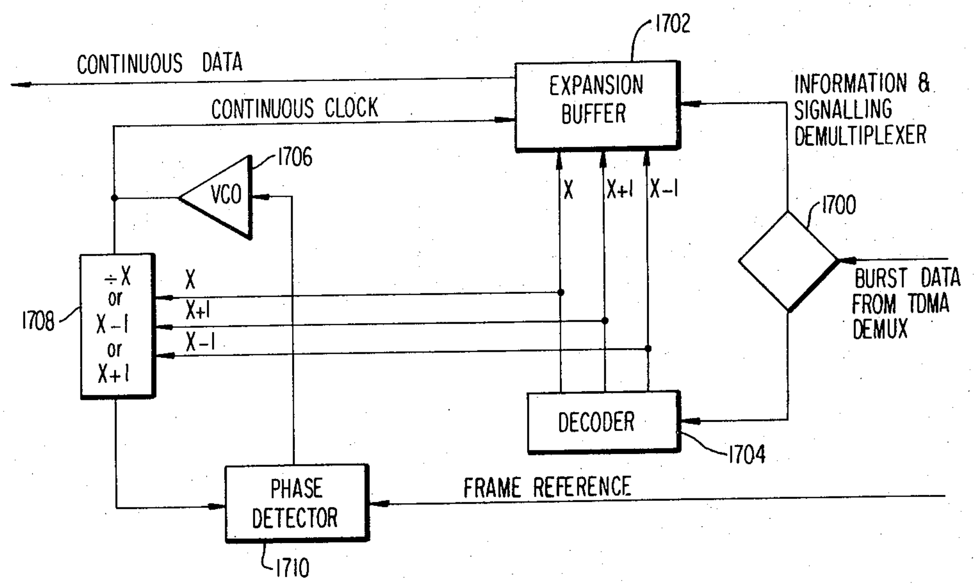
FIG. 6 is a block diagram of apparatus at a receiver for converting the data from burst forms to continuous form and for pulse destuffing.

Referring to FIG. 6, there is shown the apparatus for converting the data from burst to continuous form and for pulse destuffing. After being de-multiplexed in the TDMA frame demultiplexer (not shown) of the receiver, the serial bit stream comprising the pulse stuffing code and the digital information including the "stuffed" bit is fed to information and signaling demultiplexer 1700. Demultiplexer 1700 then feeds the digital information to expansion buffer 1702 and the pulse stuffing code to decoder 1704. Decoder 1704 decodes the pulse stuffing code which provides information concerning the number of information bits transmitted during the burst and enables the information bits to be written into expansion buffer 1702 but blocks the stuffed pulse from being written into buffer 1702.

The data stored in the expansion buffer 1702 is then read out of the buffer at a continuous data rate by the continuous clock provided by voltage controlled oscillator (VCO) 1706. The VCO 1706 is controlled by a phase detector 1710 which receives and compares two inputs: the frame reference input and the input from the clock divider 1708. Phase detector 1710 compares the time of reception of the frame reference pulse with the input from divider 1708. The output of VCO 1706 is shifted by phase detector 1710 if a predetermined difference in time of reception between the frame reference pulse and the input pulse of divider 1708 is not detected. In this manner it is assured that the expansion buffer 1702 output information rate is matched to the input information rate (data rate minus stuff rate).

It has been assumed in the discussion thus far, for purposes of explanation, that the difference in data rate between the terrestrial input data and the TDMA output data from compression buffer 1600 will vary by 1 bit per frame period, worst case, thereby necessitating transmission of a pulse stuffing bit and a pulse stuffing code each burst. However, in actuality, the difference in data rates may vary only slightly. As an example, the data rates may be asynchronous by only one full bit per 8 frames in the worst case. If this latter example is assumed, then a pulse stuffing bit need not be transmitted with each burst nor need there be transmitted a pulse stuffing code word with each burst. A method of operation may then be to distribute an 8-bit pulse stuffing code word (assuming the reliability of an 8-bit code word is adequate for system requirements) over an eight frame period and transmit the pulse stuffing bit during the eighth frame. The receiver would receive and store the pulse code stuffing bits and, during the eighth frame, would be ready to decode the complete pulse stuffing code word and process the "stuffed" bit. The distributed pulse stuffing code word technique will now be described in more detail.

Figure 5:
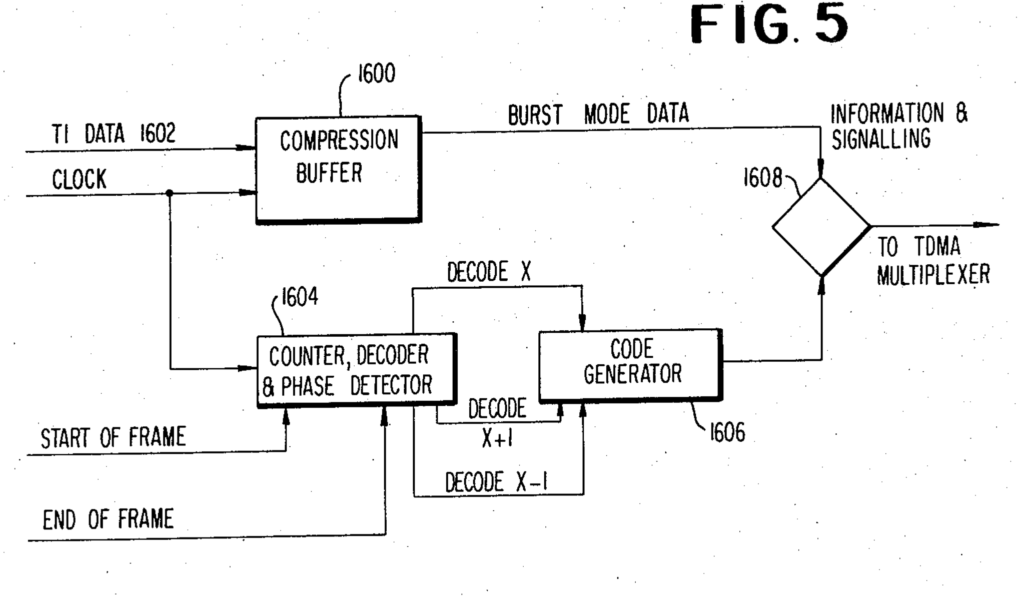
FIG. 5 is a block diagram of a pulse stuffing and burst forming apparatus at the transmitter.
Figure 7:
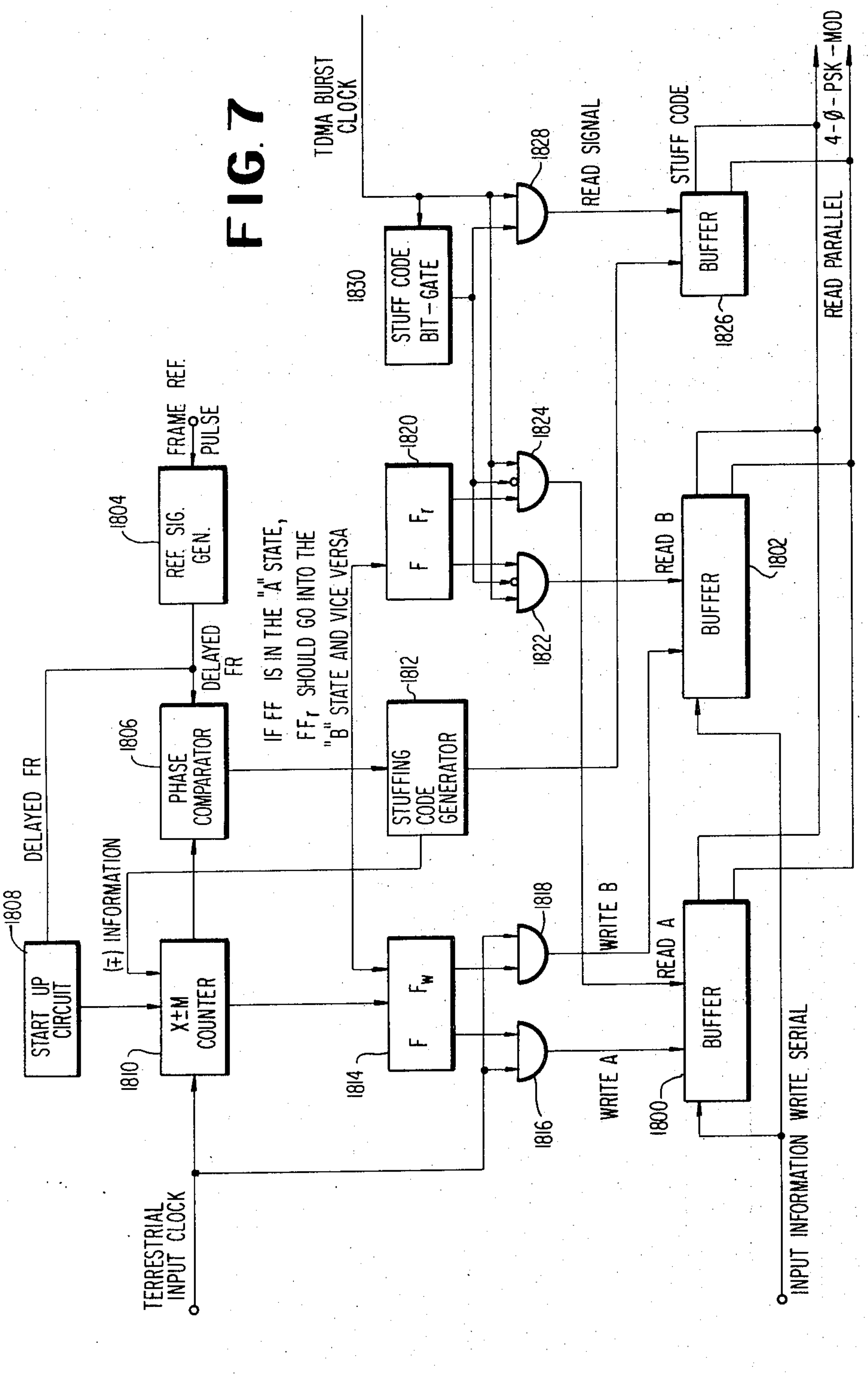
FIG. 7 is a detailed block diagram of the apparatus of FIG. 5.
Figure 8:
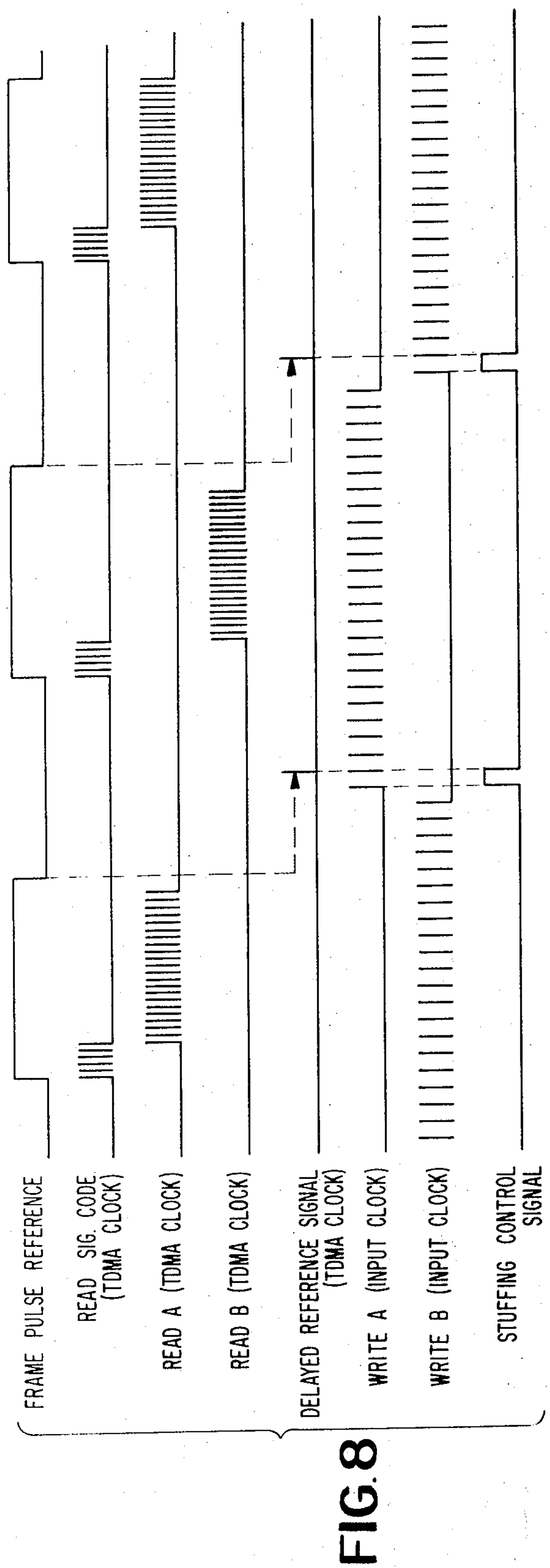
FIG. 8 is a timing diagram for the apparatus of FIG. 7.

Referring to FIG. 7 where is shown a detailed block diagram of the apparatus of FIG. 5. There is shown in FIG. 7 a first compression buffer 1800 and a second compression buffer 1802. These two compression buffers comprise compression buffer 1600 shown in FIG. 5 and are required to enable data to be written into one buffer while data, written into the second buffer during the previous frame interval, is read out of the second buffer.

A frame reference (FR) pulse indicating the start of frame is received from the burst synchronizer (not shown) and sent to reference signal generator 1804. The reference signal generator 1804 delays the frame reference pulse a predetermined period of time (for reasons hereinafter stated) and then outputs the pulse to phase comparator 1806 and start-up circuit 1808. Block 1808 in FIG. 7 is a circuit which receives pulses from a signal generator and provides an output pulse only in response to the first received input pulse. The output pulse resets counter 1810 to start the operation of the system shown in FIG. 7. The start-up circuit can be a conventional latch. As is well known a latch performs the function of the start-up circuit. If a series of pulses is applied to the said input of a latch only the first pulse sets the latch to change the output. A conventional circuit suitable for the start-up circuit is shown in the U.S. Pat. No. to Klein, 3,407,389. Reference is also made to the U.S. Pat. No. to Brewster, 2,802,052. In the Brewster patent, the primary reset device 15 shown in FIG. 1 receives a plurality of pulses from a trigger pulse generator 4. Only the first of the pulses from generator 4 causes reset device 15 to reset a counter 12. Subsequent pulses have no effect. Details of the primary reset device 15 are shown in FIG. 6 of the Brewster patent. In response to the first frame reference pulse, start-up circuit 1808 resets the counter 1810. Counter 1810 then commences counting the input clock pulses from the terrestrial clock source. Counter 1810 counts the number of terrestrial input clock pulses (equal to data bits) occurring during each frame. This number is $x \pm m$, wherein $x$ is the nominal number of input bits per frame, but due to the asynchronous condition this number may vary by $\pm m$ bits during a given frame. The number of clock pulses which counter 1810 will count in a frame interval is determined by the pulse stuffing code as will be later described. For purposes of explanation, if it is assumed the initial pulse stuffing code word sets counter 1810 to count to $x$ number of clock pulses, then at the end of this count a pulse will be emitted to phase comparator 1806 and the next clock pulse will recycle counter 1810. Phase comparator 1806 will also receive the delayed frame reference pulse from reference signal generator 1804 which commences the start of the next frame interval and indicates the end of the present frame interval. Thus in the nominal case, $x$ information bits are received each frame, the two inputs to phase comparator 1806 are in phase, the preset code in code generator 1812 remains at a code which designates $x$ information bits during a frame, and counter 1810 continues to recycle every $x$ input clocks.

In the distributed pulse stuffing code example, if it is now assumed the terrestrial digital clock is in the worst case 1 full bit time faster per 8 TDMA frames than the average TDMA clock i.e., $m = 1$, then during the frame where $x + 1$ clocks are received the output of counter 1810, which occurs at a count of $x$, will arrive at phase comparator 1806 a fraction of a bit time earlier than the delayed frame reference pulse from reference signal generator 1804. Consequently, in response to detection of this fraction of a bit time difference, phase comparator 1806 will emit a pulse instructing stuffing code generator 1812 to generate an 8-bit pulse stuffing code. The 8-bit pulse stuffing code is then fed to stuff code buffer 1826.

For a period of 7 frames compression buffers 1800 and 1802 are alternately writing in and reading out bursts of data comprising $x$ information bits. The data that is read out of the respective compression buffers 1800 and 1802 is transmitted in burst form with each of the 7 bursts including 1 bit of the distributed pulse stuffing code word.

The manner in which data is written into and read out of the compression buffers as well as the manner in which 1 bit of the pulse stuffing code is multiplexed with the information bits will now be described with relation to the writing in and reading out of data for the eighth frame, which will also include the "stuffed" pulse. At the start of the eighth frame stuffing code generator 1812 instructs counter 1810 to count to $x + 1$. When counter 1810 starts to count during the eighth frame a pulse from counter 1810 is fed to flip-flop 1814 which switches states to enable the writing in of data to compression buffer 1800, for example. During the previous frame interval flip-flop 1814 was in the other state enabling the writing of data to compression buffer 1802.

When flip-flop 1814 changes state it sends an enabling pulse to AND gate 1816 which is also receiving, as the other enabling pulse, the terrestrial input clock pulses. AND gate 1816 is thereby enabled to write into compression buffer 1800 the terrestrial input data. Gate 1816 will be enabled until counter 1810 reaches a count of $x + 1$ and is reset which in turn causes flip-flop 1814 to switch states and commence writing data into compression buffer 1802 via an enabling pulse from AND gate 1818. Therefore, compression buffer 1800 will be enabled to write in $x + 1$ information bits at the continuous, terrestrial clock rate. As can be seen from the timing diagram of FIG. 8 the delayed frame reference (FR) pulse is required to eliminate the simultaneous writing and reading of the same buffer.

To read out $x + 1$ bits from the compression buffer 1800, during the next frame interval counter 1810 will be counting to $x + 1$ and will have caused flip-flop 1814 to switch states and write data into compression buffer 1802. Consequently, flip-flop 1820 will switch states and enable AND gate 1824. Also AND gate 1828 will receive enabling pulses from the TDMA burst clock and stuff code bit gate 1830. Stuff code bit gate 1830 emits an enabling pulse one bit time each burst period which enables gate 1828 and inhibits AND gate 1824. During this one bit time the eighth bit stored in stuff code buffer 1826 is read out. Then, for the remainder of the frame interval stuff code bit gate 1830 does not emit an enabling pulse. During thie time AND gate 1824 is enabled via the TDMA burst clock, flip-flop 1820 and the invert pulse from stuff code bit gate 1830 to read out $x + 1$ bits from compression buffer 1800 at the TDMA clock rate. The burst including, in series, one bit of the distributed pulst stiff code and $x + 1$ bits of information is then fed to a modulator (not shown) and transmitted over the TDMA system. If the data timing asynchronism had been of opposite polarity, $x + 1$ bits would still be sent in the TDMA channel but only $x$ or $x - 1$ bits would be information and 1 or 2 bits would be dummy bits.

Figure 9:
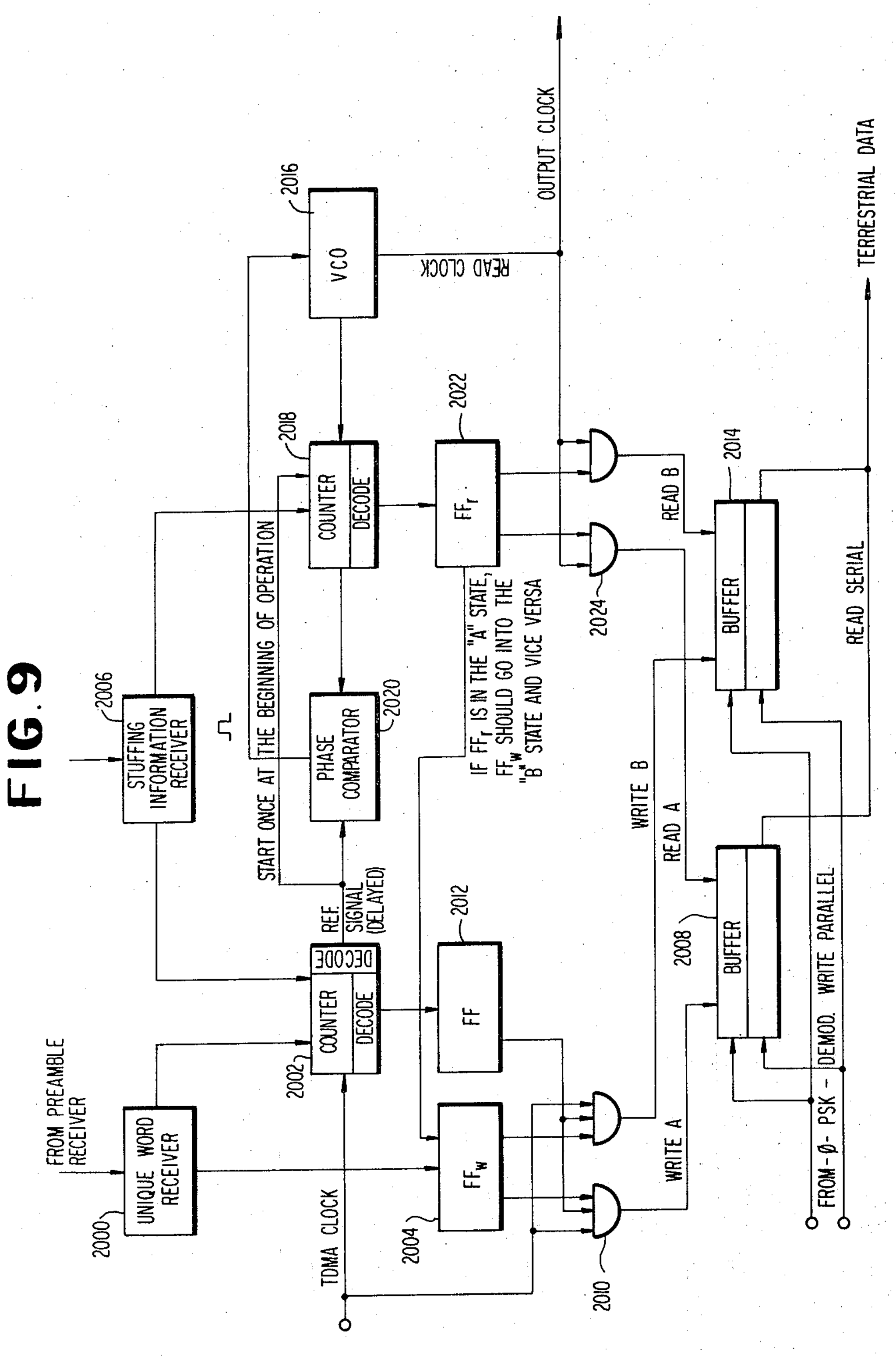
FIG. 9 is a detailed block diagram of the apparatus of FIG. 6.

Referring to FIG. 9 there is shown therein a more detailed diagram of the apparatus of FIG. 6. The discussion will assume as an example the "eighth" frame containing the "stuffed" pulse is being received though the operation of this apparatus will be basically the same for all received frames. When the frame is received timing information for the burst in the form of a unique word is fed from the unique word receiver 2000 to counter and decoder 2002 and flip-flop 2004. The unique word receiver emits a pulse which enables the counter and decoder 2002 to commence counting. The pulse stuffing information code which follows in series with the unique word is forwarded to the stuffing information receiver 2006 which, in turn, forwards the entire pulse stuffing code to the counter and decoder 2002. Counter 2002 counts at the TDMA clock rate to a number defined by the stuffing information code which, in the present example, would be $x + 1$.

While counter 2002 is counting, the burst data is written into expansion buffer 2008, for example, in the following manner. The unique word sets flip-flop 2004 to enable gate 2010. Gate 2010 also receives enabling pulses from the TDMA clock and flip-flop 2012. Gate 2010 thereby emits a write enable pulse to expansion buffer 2008 which writes in the burst data. When counter 2002 has counted to $x + 1$ the counter decodes the count and sends a reference signal to phase comparator 2020 and a pulse to flip-flop 2012. Flip-flop 2012 then removes its enabling pulse to gate 2010 thereby ceasing the writing in of data into expansion buffer 2008. While buffer 2008 is writing in the data of present burst, expansion buffer 2014 is reading out the data of the previous burst of the continuous, terrestrial clock rate provided by the voltage controlled oscillator (VCO), 2016.

The pulse stuffing code word is also forwarded to counter and decoder 2018. Counter and decoder 2018 counts at the terrestrial, data rate provided by the VCO 2016. When counter 2002 and 2018 have reached the count defined by the pulse stuffing code word the count is decoded and each counter emits a pulse to phase comparator 2020. The pulse from counter 2002 is actually delayed a predetermined period for the same reasons the frame reference pulse at the transmitter was delayed. Counter 2018 also emits a pulse to flip-flop 2022 which causes flip-flop 2022 to change state and commence reading out the data from compression buffer 2008 at the terrestrial clock rate. Expansion buffer 2008 is enabled through AND gate 2024 which is enabled by the flip-flop 2022 and VCO 2016 read clock pulses.

Phase comparator 2020 emits a pulse to control the VCO 2016 output rate if the two input signals applied to the phase comparator are not in phase. The output rate of VCO 2016 is adjusted to enable the synchronous reading out of the data stored in expansion buffer 2008. As can be seen from the timing diagram of FIG. 10, if the output pulses from counter 2002 and 2018 are not in phase a stuffing control signal will be generated to correct the VCO 2016 output frequency which shifts the phase of counter 2018 output pulse.

Block 2002 in FIG. 9 is a combination counter and decoder. As described above the device counts input clock pulses, receives code words, and provides an output pulse when the counter reaches a count represented by the code word. The device shown in FIG. 2 of the U.S. Pat. No. to Nicklas et al., 3,291,910 performs the exact same function as block 2002.

Block 2000 in FIG. 9 is described as a detector which provides an output pulse when a unique combination of bits (unique word) is received. Initially, it should be noted that FIG. 8 of all of the above-referenced Schmidt et al. applications and the associated description describes a unique word receiver or detector. Examples of unique word detectors are also shown in U.S. Pat. Nos. to Moreau, 3,598,979, and Scott et al., 3,346,844.

Block 2006 in FIG. 9 is a circuit which merely passes received bits to blocks 2002 and 2018. Block 2006 does not perform any decoding operation and does not perform any segregating function. It merely transfers received bits. It could simply be a connection having one input and two outputs. If the counter decoders decode words received parallel-by-bit rather than words received serial-by-bit, block 2006 could be a serial-to-parallel converter. Typical examples of serial-to-parallel converters are shown in the U.S. Pat. Nos. to Root et al., 3,151,314, and Barnes et al., 3,253,162.

Block 2016 in FIG. 9 is a voltage controlled oscillator having an output signal which is phased adjusted in accordance with an input from a phase comparator. Voltage controlled oscillators of this type are well known in the art. The U.S. Pat. No. to Henrion, 3,221,260, shows that it is conventional to include a voltage controlled oscillator in a loop with a phase comparator. The result of the phase comparison controls the output phase of the voltage controlled oscillator. Details of the voltage controlled oscillator are shown in FIG. 2 of Henrion. Also, see Kolbold et al., U.S. Pat. No. 3,534,285.

The discussion has been based on an example of an 8-bit distributed pulse stuffing code word for a 1 bit per 8 TDMA frame asynchronous condition though the invention is not to be so limited. As another example, if the asynchronous condition is 1 bit/13 TDMA frames and the TDMA system requires a pulse stuffing code word of 19 bits to assure reliable reception an approach may be to distribute 2 bits at a time over 13 frames. This would solve the asynchronous problem and provide a greater reliability of reception of the pulse stuffing word due to its 26-bit length, in lieu of the 19 bit code minimum requirement. Any combination of asynchronism and stuff code word reliability can be accommodated.

The above description related to the technique of employing a distributed pulse stuffing code. However, it may be desired to employ the technique of stuffing each frame period, which would require the transmission each frame of a complete pulse stuffing code word. To do this, counter 1810 would be updated each frame period to count to $x$ or $x \pm m$ bits each frame period depending on the phase relationship in phase comparator 1806 between counter 1810 and reference signal generator 1804. In addition, all the bits of the pulse stuffing code stored in stuff code buffer 1826 would be read out each frame period. Stuff code bit gate 1830 would be programmed to emit the number of enabling pulses to gate 1828 necessary to read out of buffer 1826 the number of bits in the pulse stuffing code word. At the receiver the counters and decoders 2002 and 2018 would be updated every frame period to write in and read out of respective expansion buffers 2008 and 2014 the number of bits stored therein in accordance with the information provided by the pulse stuffing code.

Specific logic for performing various functions such as the phase comparing function of phase comparator 1806 and 2020 or the generating of a stuffing code by stuffing code generator 1812 would be known to one skilled in the art.

We claim:

1. In a time division multiple access (TDMA) communications system having a fixed frame rate determined by frame reference pulses, the improvement comprising, a. first means adapted to receive information bits at a rate which is not synchronized to said fixed frame rate;

b. means for detecting the number of information bits received during each said fixed frame;

c. means responsive to said detecting means and to said received information bits for temporarily storing the information bits received each frame;

d. means responsive to said detecting means for generating and temporarily storing a code word identifying the number of information bits received and stored in a frame; and e. means responsive to a predetermined number of clock pulses synchronized to said frame rate and occurring each frame, for reading out from said code word storing means and said information bit storage means, a fixed number of bits, dependent upon the number of said clock pulses, said fixed number of bits always including all information bits stored during the previous frame.

2. A system as claimed in claim 1 wherein said means for generating and storing a code word comprises means responsive to said detecting means for generating said code word only in response to said detecting means detecting a number of information bits per frame different than preset number corresponding to the nominal number of information bits per frame.

3. A system as claimed in claim 2 wherein said means for reading out comprises means responsive to a first group of said clock pulses for reading out from said code storage means less than the entire code word, wherein said stored code word is read out and submultiplexed over a number of frames.

4. A system as claimed in claim 1 wherein said means for generating and storing a code word comprises means responsive to said detecting means for generating and storing a code word each frame identifying the number of information bits received and stored during said frame.

5. A system as claimed in claim 4 wherein said read out means comprises means responsive to a number of said clock pulses equal in number to the number of bits in said code word for reading out said complete code word, wherein a code word is completely read out each frame and included in said fixed number of bits.

6. A system as claimed in claim 1 wherein said detecting means comprises, a. a counter adapted to count clock pulses occurring at the information bit rate, and provide a first output pulse when said counter reaches a predetermined number, *x;* b. a phase comparator responsive to said first pulses and said frame reference pulses for providing an output representing the out-of-phase condition of said first pulses and said frame reference pulses.

7. A system as claimed in claim 6 further comprising means responsive to said code generating means for causing said counter to recycle at a count corresponding to the number represented by said code word.

8. A system as claimed in claim 6 wherein said information bit storage means comprises:

a. first and second buffer storage means, each adapted to write in information bits applied thereto when write-enabled and to read out their contents when read-enabled, and b. read-write enabling means responsive to the recycling of said counter and said predetermined number of clock pulses for alternately write-enabling said first and second buffer storage means and read-enabling said first and second storage means each recycle of said counter, one of said buffer storage means being read-enabled while the other is write-enabled.

9. A system as claimed in claim 8 further comprising:

a. receiver storage means;

b. means responsive to said code word in said fixed number of bits for gating only the information bits in said fixed number of bits into said receiver storage means; and c. means responsive to said code word and to said frame reference pulses for reading out the information bits in said receiver storage means at a rate corresponding to the said information bit rate.

* * * * *

UNITED STATES PATENT OFFICE

CERTIFICATE OF CORRECTION

Patent No. 3, 825,899 Dated July 23, 1974

Inventor(s) Heinz H. Haeberle et al

It is certified that error appears in the above-identified patent and that said Letters Patent are hereby corrected as shown below:

IN THE SPECIFICATIONS:

Col. 1, line 9 - after "in" delete "a synchronous" and substitute -- asynchronous--

Col. 4, line 42 - after "above" delete "with" and substitute -- each--

Col. 6, line 38 - after "the" delete "next" and substitute--unit--

Col. 7, line 56 - after "has" change "geen" to -- been--

Col. 8, line 21 - after "404" change "is" to -- in --

Col. 9, line 53 - before "1604" insert-- phase detector--

Col. 9, line 54, delete "phase detector".

Col. 10, line 11 - after "clock" "pulses" should be -- pulse--

Col. 12, line 66 - after "during" "thie" should be--this--

Col. 13, line 3, - after "distributed" "pulst stiff" should be-- pulse stuff--

Col. 13, line 42- after "burst" "of" should be -- at--

Signed and sealed this 7th day of January 1975.

(SEAL)
Attest:

McCOY M. GIBSON JR.
Attesting Officer

C. MARSHALL DANN
Commissioner of Patents

FORM PO-1050 (10-69)

USCOMM-DC 60376-P69
☆ U.S. GOVERNMENT PRINTING OFFICE : 1969 O—366-334.